US012780179B2

(12) United States Patent
Kim

(10) Patent No.: US 12,780,179 B2
(45) Date of Patent: Nov. 3, 2026

(54) DRIVING STABILIZATION SYSTEM FOR FOUR-WHEEL DRIVE VEHICLE

(71) Applicant: Yo Han Kim, Pyeongtaek-si (KR)

(72) Inventor: Yo Han Kim, Pyeongtaek-si (KR)

( * ) Notice: Subject to any disclaimer, the term of this patent is extended or adjusted under 35 U.S.C. 154(b) by 361 days.

(21) Appl. No.: 18/684,735

(22) PCT Filed: Jun. 27, 2022

(86) PCT No.: PCT/KR2022/009146
§ 371 (c)(1),
(2) Date: Feb. 19, 2024

(87) PCT Pub. No.: WO2023/022357
PCT Pub. Date: Feb. 23, 2023

(65) Prior Publication Data

US 2024/0367641 A1 Nov. 7, 2024

(30) Foreign Application Priority Data

Aug. 19, 2021 (KR) ........................ 10-2021-0109797
Jun. 15, 2022 (KR) ........................ 10-2022-0072889

(51) Int. Cl.
*B60W 30/045* (2012.01)
*B60K 17/354* (2006.01)
(Continued)

(52) U.S. Cl.
CPC ......... *B60W 30/045* (2013.01); *B60K 17/354* (2013.01); *B60K 23/08* (2013.01);
(Continued)

(58) Field of Classification Search
CPC .... B60W 30/045; B60W 10/02; B60W 10/16; B60W 10/196; B60W 2520/26;
(Continued)

(56) References Cited

U.S. PATENT DOCUMENTS 6,704,627 B2 * 3/2004 Tatara .................... B60W 10/02 903/917
8,924,114 B2 * 12/2014 Matsuno ............. B60W 30/045 701/69
(Continued)

FOREIGN PATENT DOCUMENTS

JP 2010-531760 A 9/2010
KR 10-2011-0061015 A 6/2011
KR 10-2018-0102047 A 9/2018

OTHER PUBLICATIONS

International Search Report dated Sep. 30, 2022 in International Application No. PCT/KR2022/009146.

*Primary Examiner* — Huan Le
(74) *Attorney, Agent, or Firm* — KORUS Patent, LLC; Seong Il Jeong

(57) ABSTRACT

A driving stabilization system for a four-wheel drive vehicle is proposed. This system includes a plurality of axles each comprising both of a driving shaft connected to a front differential or rear differential of the four-wheel drive vehicle and a driven shaft connected to the driving shaft and configured to transmit power of the driving shaft to a wheel, an axle-specific disconnection device for disconnecting a connection between the driving shaft and the driven shaft, an axle-specific attenuation device for attenuating a driving force of the driving shaft, and a control unit for stabilizing vehicle driving by controlling some of the disconnection devices and attenuation devices in a case where vehicle driving stabilization is required.

13 Claims, 11 Drawing Sheets

(51) Int. Cl.
*B60K 23/08* (2006.01)
*B60W 10/02* (2006.01)
*B60W 10/16* (2012.01)
*B60W 10/196* (2012.01)

(52) U.S. Cl.
CPC ............ *B60W 10/02* (2013.01); *B60W 10/16* (2013.01); *B60W 10/196* (2013.01); *B60W 2520/26* (2013.01); *B60W 2520/28* (2013.01); *B60W 2540/18* (2013.01); *B60W 2710/021* (2013.01); *B60W 2710/12* (2013.01); *B60W 2710/18* (2013.01)

(58) Field of Classification Search
CPC ......... B60W 2520/28; B60W 2540/18; B60W 2710/021; B60W 2710/12; B60W 2710/18
See application file for complete search history.

(56) References Cited

U.S. PATENT DOCUMENTS

2016/0356370 A1 12/2016 Richards et al.
2021/0053435 A1 2/2021 Ito et al.

* cited by examiner

DRIVING STABILIZATION SYSTEM FOR FOUR-WHEEL DRIVE VEHICLE

CROSS-REFERENCE TO RELATED APPLICATIONS

This application is the U.S. national stage application of International Patent Application No. PCT/KR2022/009146, filed Jun. 27, 2022, which claims the benefit under 35 U.S.C. § 119 of Korean Application Nos. 10-2021-0109797, filed Aug. 19, 2021; and 10-2022-0072889, filed Jun. 15, 2022; the disclosures of each of which are incorporated herein by reference in their entirety.

TECHNICAL FIELD

The present disclosure relates to driving stabilization technology for a vehicle and, more particularly, to driving stabilization technology for a four-wheel drive vehicle.

BACKGROUND ART

A differential is a device for changing rotation speeds depending on resistance applied to opposite ends thereof, and is an essential device for turning a vehicle. However, when there occurs wheel slip in which resistance on one side of the differential is lowered due to wheels coming into contact with a slippery road surface, power is not transmitted to the other side of the differential, and thus driving force of the vehicle is lost. In addition, in the case of a four-wheel drive vehicle, a differential is installed on each of a front axle and a rear axle, so the symptom is more severe than a two-wheel drive vehicle. Torque vectoring is well known as a way to solve such a symptom. Torque vectoring refers to enabling posture control of a vehicle body by controlling resistance applied to both ends of a differential to change output rotation speeds.

However, since vehicles have a power transmission structure in which engine power is transmitted to wheels through a differential and through axles, conventional methods of controlling body postures of the vehicles through braking force or through lowered engine output have limitations, resulting in reduction of driving performance. In the conventional methods, the control is performed, wherein a center differential is additionally installed between a front axle and a rear axle, or braking power of a vehicle body is used, or torque vectoring is utilized, but deterioration in the driving performance is inevitable due to a structure in which an engine, a power transmission device, and a braking device operate together to transmit power as the engine's power is directly transmitted to the wheels through the differential.

Meanwhile, in case of a four-wheel drive vehicle that is driving in the four-wheel drive mode, since rotation speeds of front wheels and rear wheels are constant, a turning radius difference between a center radius of the front wheels and a center radius of the rear wheels is converted to a tire rotation difference and a driving-shaft rotation difference when the four-wheel drive vehicle is driving on a dry paved road or is making a sharp turn while driving, and accordingly, there occurs a so-called tight corner braking phenomenon where a driver gets a feeling that the front wheels are braking and the rear wheels are idling, thereby causing deterioration of cornering performance of the vehicle. Such a tight corner braking phenomenon may cause serious damage to drivetrains, front and rear differentials, etc., and is a cause of reducing durability. As a turning radius becomes smaller, this phenomenon becomes more evident.

DISCLOSURE

Technical Problem

An objective of the present disclosure is to provide a technical solution for enabling wheel-slip control while inhibiting deterioration of driving performance.

In addition, another objective of the present disclosure is to provide a technical solution for solving a tight corner braking phenomenon.

Technical Solution

According to one aspect, there is provided a driving stabilization system for a four-wheel drive vehicle, the system including: a plurality of axles each comprising both of a driving shaft connected to a front differential or rear differential of the four-wheel drive vehicle and a driven shaft connected to the driving shaft and configured to transmit power of the driving shaft to a wheel; an axle-specific disconnection device for disconnecting a connection between the driving shaft and the driven shaft; an axle-specific attenuation device for attenuating a driving force of the driving shaft; and a control unit for stabilizing vehicle driving by controlling some of the disconnection devices and attenuation devices in a case where vehicle driving stabilization is required.

In a case where wheel slip requiring the vehicle driving stabilization occurs, the control unit may control the disconnection device provided on a slip wheel side to disconnect the connection between the driving shaft and the driven shaft, and control the attenuation device provided on the slip wheel side to attenuate the driving force of the driving shaft, so as to cause the power to be transmitted through the corresponding axle to an opposite wheel connected to a same differential as that of a slip wheel.

In a case where a tight corner braking phenomenon requiring the vehicle driving stabilization is detected while the vehicle is turning, the control unit may control the disconnection device provided on a side of any one inner wheel among inner wheels in a turning direction to disconnect the connection between the driving shaft and the driven shaft, and control the attenuation device provided on the inner wheel side to attenuate the driving force of the driving shaft, so as to transmit the power to an outer wheel through the corresponding axle.

Meanwhile, according to one aspect, there is provided a driving stabilization method for a four-wheel drive vehicle, the method including: determining whether driving stabilization of the four-wheel drive vehicle is required or not; controlling disconnection of a connection between a driving shaft and driven shaft of any one axle among a plurality of axles each comprising both of the driving shaft connected to a front differential or rear differential and the driven shaft connected to the driving shaft and configured to transmit power of the driving shaft to a wheel when the driving stabilization of the four-wheel drive vehicle is required; and controlling attenuation of a driving force of the connection-blocked driving shaft.

Advantageous Effects

According to the present disclosure, there are effects that vehicle driving stabilization (i.e., vehicle posture stabilization) is enabled through disconnection and/or attenuation control and so-called recoupling after recovery control, and thus the control is enabled even without lowering power output of an engine or power pack. In particular, driving stabilization may be effectively achieved against phenomena of wheel slip and/or tight corner braking.

MODE FOR INVENTION

The above-described and additional aspects of the present disclosure will become more apparent through preferred exemplary embodiments described with reference to the attached drawings. Hereinafter, the present disclosure will be described in detail through such exemplary embodiments so that those skilled in the art may easily understand and reproduce the exemplary embodiments.

Figure 1:
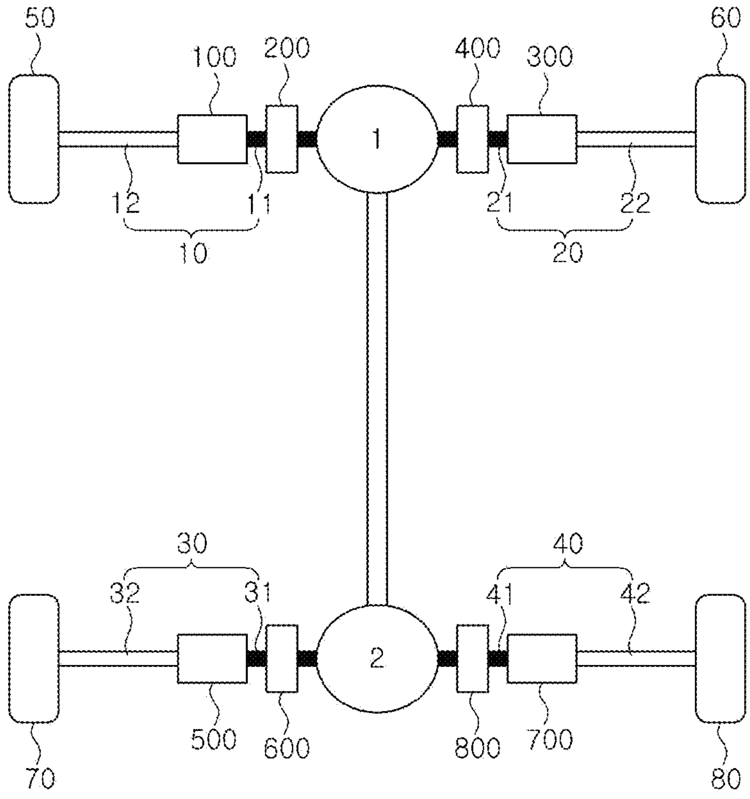
FIG. 1 is a view illustrating a component arrangement for driving stabilization for a four-wheel drive vehicle according to an exemplary embodiment.
Figure 2:
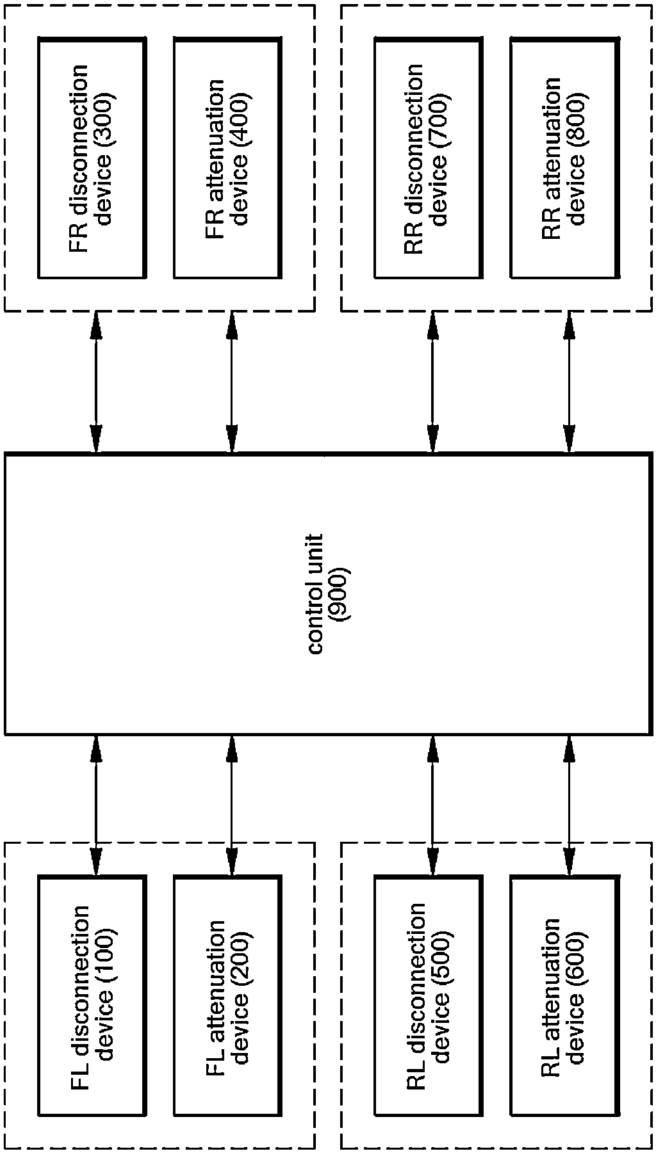
FIG. 2 is a block diagram illustrating a driving stabilization system according to the exemplary embodiment.

FIG. 1 is a view schematically illustrating a component arrangement for driving stabilization for a four-wheel drive vehicle according to an exemplary embodiment, and FIG. 2 is a block diagram illustrating a driving stabilization system according to the exemplary embodiment. A front differential 1 is connected to a front left wheel (i.e., a FL wheel) 50 and a front right wheel (i.e., a FR wheel) 60 through a front left axle 10 and a front right axle 20, and a rear differential 2 is connected to a rear left wheel (i.e., an RL wheel) 70 and a rear right wheel (i.e., an RR wheel) 80 through a rear left axle 30 and a rear right axle 40. Here, the axles 10, 20, 30, and 40 are respectively composed of driving shafts 11, 21, 31, and 41 and driven shafts 12, 22, 32, and 42. The driving shafts 11, 21, 31, and 41 are shafts connected to the differentials 1 and 2 and driven to rotate, and the driven shafts 12, 22, 32, and 42 are shafts respectively coupled (connected) to the driving shafts 11, 21, 31, and 41 so as to transmit driving force of the driving shafts 11, 21, 31, and 41 to corresponding wheels.

Under the control of the control unit 900, respective connections between the driving shafts 11, 21, 31, and 41 and the driven shafts 12, 22, 32, and 42 may be blocked (disconnected), or may be reconnected after the disconnection. To this end, disconnection devices 100, 300, 500, and 700 may be configured therefor. In addition, attenuation devices (i.e., differential attenuation devices) 200, 400, 600, and 800 for lowering rotation speeds of the driving shafts 11, 21, 31, and 41 may also be configured for respective axles. Additionally, although not shown in FIGS. 1 and 2, the driving stabilization system may also be configured to include sensors (e.g., an ABS wheel rotation speed sensor, a steering angle sensor, a yaw sensor, a driving-shaft rotation speed sensor, etc.) for collecting information used to determine whether vehicle driving stabilization is required or not.

Meanwhile, in FIG. 1, although each of the disconnection devices 100, 300, 500, and 700 and attenuation devices 200, 400, 600, and 800 is shown as being configured separately, this is just intended to clearly indicate arrangement locations thereof, so these components may also be integrally formed. That is, the disconnection devices 100, 300, 500, and 700 and the attenuation devices 200, 400, 600, and 800 may be devices separately configured, or may also be devices integrally formed. In the case where the disconnection devices 100, 300, 500, and 700 and the attenuation devices 200, 400, 600, and 800 are integrally formed respectively, each integrally formed device may be called as a disconnection/attenuation device, and as an example, types of the disconnection/attenuation device may include: a claw clutch type; a planetary gear type; or a retarder-applied electronic clutch type. In addition, in FIG. 1, the control unit 900 may designate and manage the left wheels as one group and the right wheels as the other group. That is, the FL wheel 50 and RL wheel 70 belong to a same group (i.e., a first group), and the FR wheel 60 and RR wheel 80 belong to a same group (i.e., a second group).

The control unit 900 may be a controller configured in systems which are known as vehicle dynamic control (VDC), electronic stability control (ESC), electronic stability program (ESP), etc. In addition, the control unit 900 may also include a controller configured in a system for wheel braking control. In a case where vehicle driving stabilization is required, such a control unit 900 controls some of the disconnection devices 100, 300, 500, and 700 and the attenuation devices 200, 400, 600, and 800, thereby stabilizing vehicle driving. Specifically, the vehicle driving may be stabilized by way of controlling disconnection of a connection between a driving shaft and a driven shaft, and controlling attenuation of a rotation speed of the driving shaft. In addition, an occasion where the vehicle driving stability is required may be wheel slip or tight corner braking.

Figure 3:
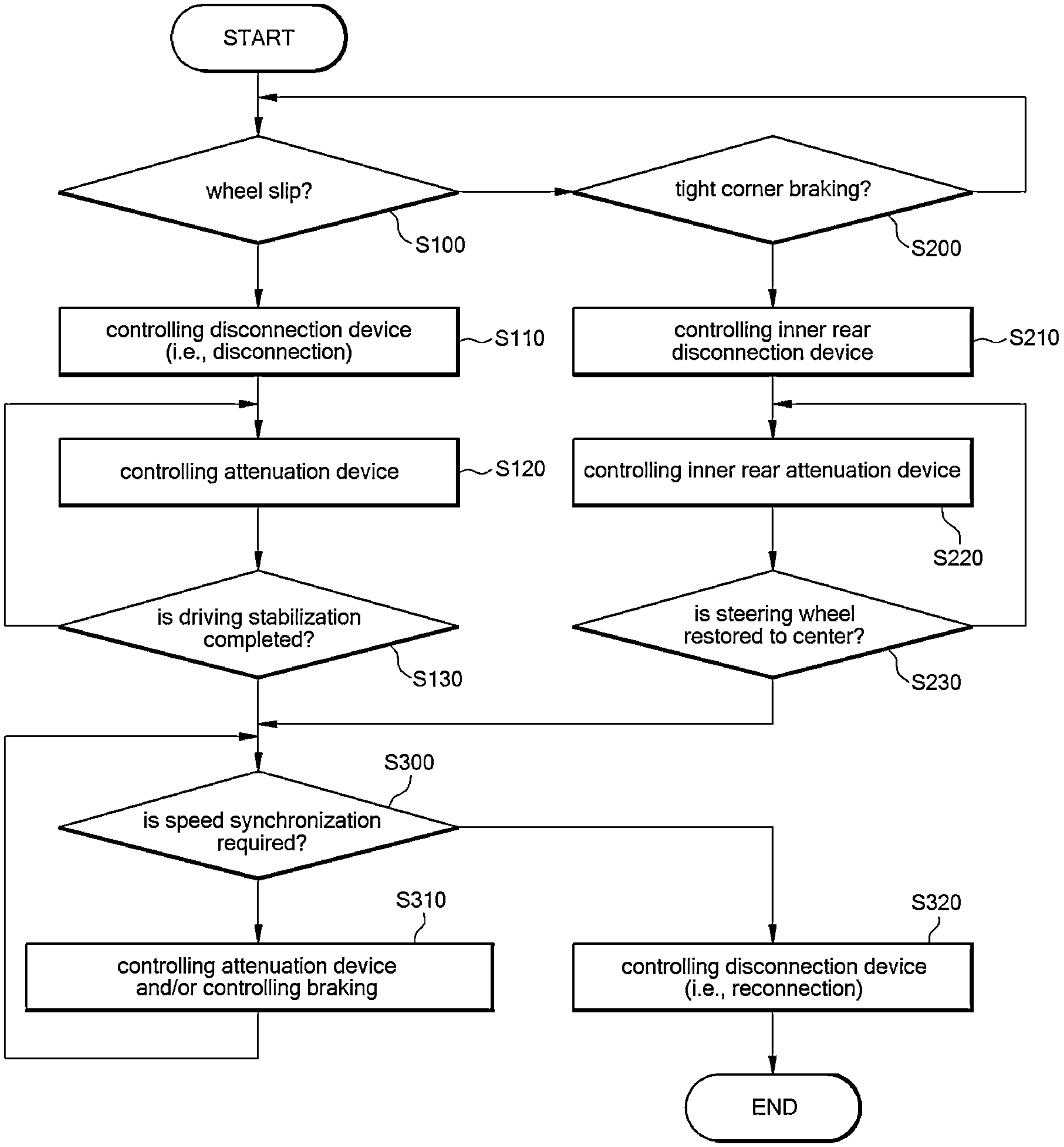
FIG. 3 is a flowchart illustrating a driving stabilization control method according to the exemplary embodiment.
Figure 4:
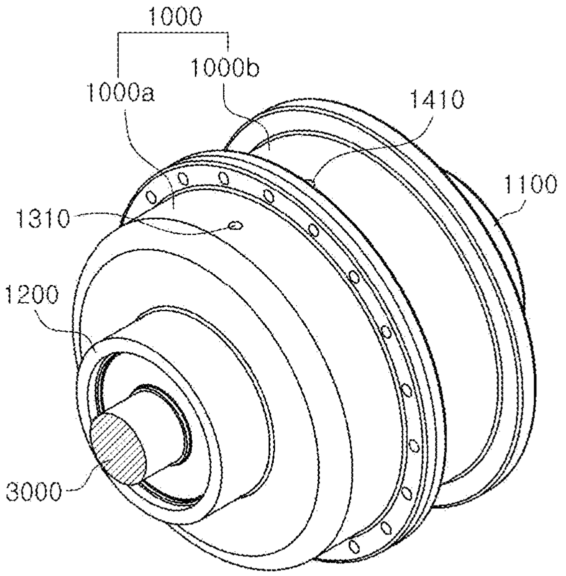
FIGS. 4 and 5 are perspective views illustrating a disconnection/attenuation device according to the exemplary embodiment.
Figure 5:
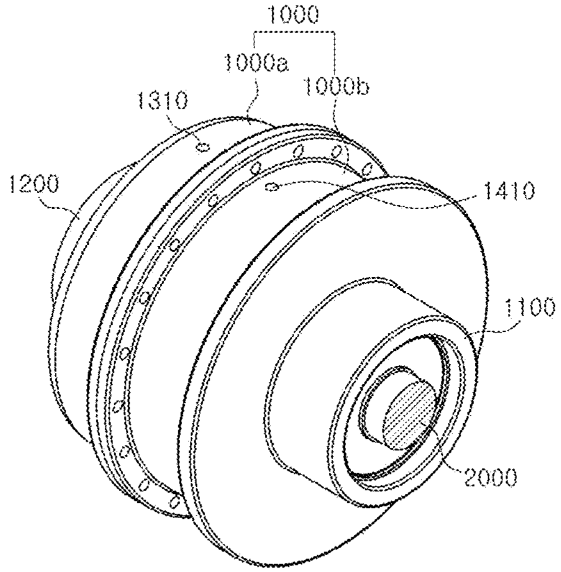
Figure 6:
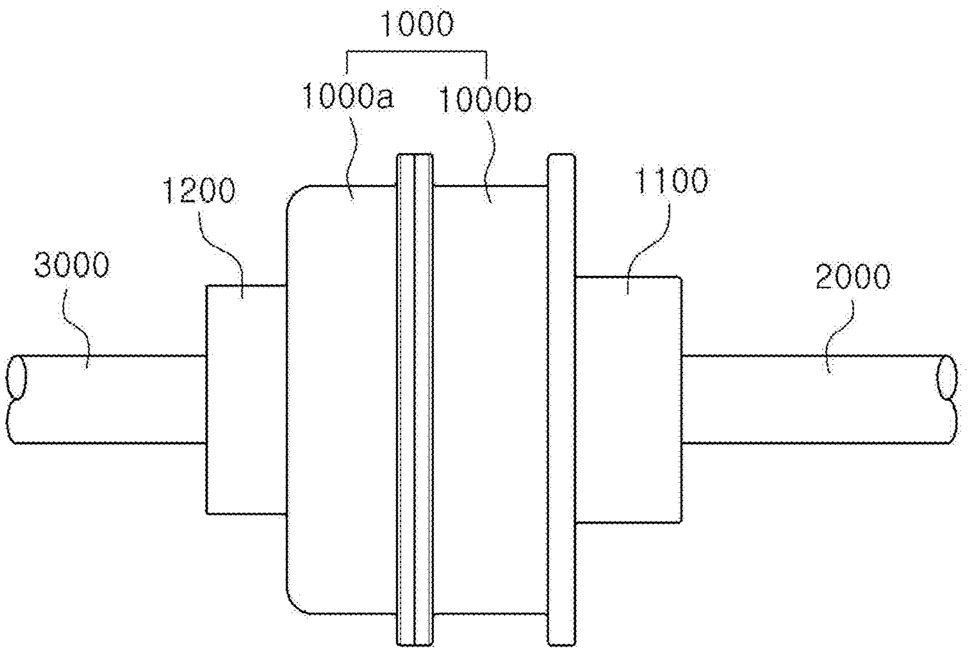
FIG. 6 is a side view illustrating the disconnection/attenuation device according to the exemplary embodiment.

FIG. 3 is a flowchart illustrating a driving stabilization control method for a four-wheel drive vehicle according to the exemplary embodiment, and this flowchart shows a control method for eliminating wheel slip and tight corner braking. In step S100, a control unit 900 determines whether wheel slip occurs in a driving vehicle or not. In the exemplary embodiment, the control unit 900 receives rotation speed values from respective ABS wheel-speed sensors, and determines that wheel slip has occurred in a wheel having a higher rotation speed in a case determined that a rotation speed difference between front and rear wheels belonging to a same group is greater than or equal to a reference value. In this case, whether the vehicle is turning or not may also be considered. Reference values for a case where the vehicle is turning and a case where the vehicle is not turning may be different from each other. Such a method of determining whether wheel slip has occurred or not is only an example and is not limited thereto, and may be embodied according to what is already widely known.

In step S110, when it is determined that the wheel slip has occurred in step S100, the control unit 900 controls a disconnection device of an axle connected to the wheel in which the slip has occurred (i.e., the slip wheel) so as to disconnect a connection between the driving shaft and driven shaft of the corresponding axle. For example, when it is determined that the slip has occurred in the FL wheel 50, the control unit 900 controls the FL disconnection device 100 to disconnect a connection between the driving shaft 11 and driven shaft 12 of the FL axle 10. However, when only the disconnection is made, a left side of a front differential 1 also loses driving resistance and rotates at a faster speed therein while being separated from the FL wheel 50, whereby the FR axle 20 becomes unable to receive power transmitted thereto. In step S120, in order to inhibit this occasion, the control unit 900 controls the FL attenuation device 200 to attenuate a speed of the driving shaft 11 of the FL axle 10, thereby allowing the power to be transmitted to the FR wheel 60. That is, by generating a false driving resistance equivalent to the resistance generated during normal driving on the FL side where power transmission is blocked (through the differential attenuation control), the FR wheel 60 is allowed to rotate at a normal speed.

In step S130, the control unit 900 determines whether the driving of the vehicle is stabilized or not through the disconnection control and attenuation control. That is, the control unit 900 determines whether postures of the vehicle body are stabilized or not. In the exemplary embodiment, the control unit 900 determines that the driving of the vehicle is stabilized when a rotation speed of the FR wheel 60 becomes the same as a rotation speed of a target wheel. Here, the target wheel refers to the other wheel belonging to the same group as the FR wheel 60, and in this example, the RR wheel 80 is the target wheel. That is, the target wheel is not fixed once designated, but is changeable depending on a slip wheel. A wheel belonging to the same group as the opposite wheel connected to the same differential as the slip wheel becomes the target wheel.

When it is determined that the driving is not stabilized in step S130, the control unit 900 controls the FL attenuation device 200 again so that a rotation speed of the FR wheel 60 becomes the same as a rotation speed of the target wheel. That is, an attenuation force of the FL attenuation device 200 is corrected to adjust the rotation speed of the FR wheel 60 to the rotation speed of the target wheel. By repeating these operations, the control unit 900 determines that vehicle driving is stabilized when the rotation speeds of the two wheels become the same. Meanwhile, the control unit 900 may also perform ABS braking control for the FL wheel 50 whose power transmission is blocked, and this operation may be performed together with the attenuation device control in step S120. This is to enable steering without the FL wheel 50 slipping through braking control.

According to the above description, power is continuously transmitted to wheels other than the slip wheel, and there arises no speed difference between the front and rear axles, so quiet driving is enabled without a center differential. In addition, even the wheel with power cut off continues to be controlled by braking, so the posture control of the vehicle becomes smoother.

When it is determined that the driving is stabilized in step S130, the control unit 900 controls the FL disconnection device 100 to reconnect the disconnected FL driving shaft 11 and FL driven shaft 12 to each other in step S320, thereby controlling the FL wheel 50 to transmit power normally. In this case, in step S310, the control unit 900 does not unconditionally perform step S320 just because the driving has been stabilized, but performs speed synchronization when the speed synchronization is required. This is because reconnection is difficult in a case where a speed difference between opposite ends of a disconnection device is out of an allowable range.

In the exemplary embodiment, the control unit 900 compares a rotation speed of the FL wheel 50 and a rotation speed of the FL driving shaft 11, and performs attenuation control and/or braking control when a speed difference exceeds an allowable speed value, so as to make the speed difference to be less than or equal to the allowable speed value. Here, the allowable speed value may be 30 RPM. Accordingly, when a rotation speed of the FL wheel 50 and a rotation speed of the FL driving shaft 11 are less than or equal to 30 RPM, step S320 is performed immediately. Otherwise, step S320 is performed after performing step S310.

In a case where a rotation speed of the FL wheel 50 is higher than a rotation speed of the FL driving shaft 11 and a speed difference exceeds the allowable speed value, the control unit 900 may perform ABS braking control and/or attenuation control. In this case, the braking control may target the FL wheel 50, and the attenuation control may target the FR attenuation device 400. In a case where a rotation speed of the FL wheel 50 is lower than a rotation speed of the FL driving shaft 11 and a speed difference exceeds the allowable speed value, the control unit 900 may only perform the attenuation control. In this case, the attenuation control may target the FL attenuation device 200.

Next, a control method for tight corner braking is described. In step S200, the control unit 900 detects a tight corner braking phenomenon. In the exemplary embodiment, in a case where a steering angle confirmed through a steering angle sensor is greater than or equal to a preset steering angle of interest and a turning speed of a vehicle increases while the condition of the steering angle greater than or equal to the steering angle of interest continues for more than a predetermined period of time, the control unit 900 determines that tight corner braking has occurred or the possibility of occurring tight corner braking exists. Here, the steering angle of interest may be the maximum steering angle or an angle close to the maximum steering angle. In addition, for reference, in FIG. 3, step S200 is shown as being performed after step S100, but is not limited thereto and may be performed independently of step S100.

When it is determined as "YES" (i.e., when the tight corner braking phenomenon is detected) in step S200, the control unit 900 controls, in step S210, an inner rear disconnection device (i.e., a disconnection device on an inner rear wheel side) in a turning direction and disconnects a connection between a driving shaft and a driven shaft in order to inhibit or eliminate the tight corner braking phenomenon in advance. That is, in a case of a left turn, the control unit 900 controls the RL disconnection device 500 connected to the RL wheel 70 to disconnect a connection between the driving shaft 31 and driven shaft 32 of the RL axle 30, and in a case of a right turn, the control unit 900 controls the RR disconnection device 700 connected to the RR wheel 80 to disconnect a connection between the driving shaft 41 and driven shaft 42 of the RR axle 40.

In step S220, after the disconnection control, the control unit 900 controls an inner rear attenuation device to transmit power to an outer rear wheel. That is, in the case of the left turn, the RL attenuation device 600 is controlled to transmit the power to the RR wheel 80, and in the case of the right turn, the RR attenuation device 800 is controlled to transmit the power to the RL wheel 70. The reason for operation in this way is because when only the disconnection is done as in the case of the slip wheel described above, the power is not transmitted to the outer rear wheel, causing the outer wheel to stop.

Next, in step S230, the control unit 900 determines whether the steering wheel has been restored to a center range through a steering angle confirmed through a steering angle sensor. When it is determined that the steering wheel has been restored to the center range in step S230, the control unit 900 controls a corresponding disconnection device to reconnect a driving shaft and a driven shaft to each other. That is, in the case where the steering wheel is restored to the center range after the left turn, the control unit 900 controls the RL disconnection device 500 to reconnect the RL driving shaft 31 and the RL driven shaft 32 to each other, and in the case where the steering wheel is restored to the center range after the right turn, the control unit 900 controls the RR disconnection device 700 to reconnect the RR driving shaft 41 and the RR driven shaft 42 to each other. At this time, in steps S300, S310, and S320, the control unit 900 does not unconditionally reconnect the driving shaft and the driven shaft to each other just because the steering angle has become an approximate angle for straight driving, but as in the wheel slip case, in a case where speed synchronization for both ends of the corresponding disconnection device is required, the control unit 900 performs the speed synchronization and then reconnects the driving shaft and the driven shaft to each other.

In the above-described step S220, the control unit 900 may control the inner rear attenuation device to change a speed of a wheel at an opposite side of a differential, thereby controlling three wheels at speeds appropriate for respective turning radii thereof. Compared to the case of a wheel slip, as described above, the wheel-slip control controls a rotation speed of a control object wheel to be equal to a rotation speed of a target wheel. Whereas, the tight corner braking control controls to operate an attenuation device of an inner wheel with blocked connection and calculate a speed of an outer wheel at the opposite side of the differential so that the outer wheel turns appropriately for a turning radius thereof.

Step S220 is described in detail by using the case of the left turn. In the exemplary embodiment, the control unit 900 determines, as a target rotation value, a value obtained by applying a weight to a value obtained by averaging a rotation speed of the FL wheel 50 and a rotation speed of the FR wheel 60 and controls the RL attenuation device 600 so that a rotation speed of the RR wheel 80 which is an outer rear wheel reaches the determined target rotation value. Here, the target rotation value is not fixed once designated, but is naturally changeable depending on changes in a rotation speed value of the FL wheel 50 and a rotation speed value of the FR wheel 60. That is, an attenuation force of the RL attenuation device 600 is corrected while updating the target rotation value by using the rotation speed values continuously received from the respective wheel speed sensors.

In addition, a weight which is applied when to calculate a target rotation value takes into account a difference between turning radii of the front and rear wheels. Since rotation speeds of the rear wheels are faster than rotation speeds of the front wheels because of the difference between the turning radii, the target rotation value is to be determined by considering this matter and reflecting the appropriate weight. Here, the weight may vary depending on steering angles, and may be preset and applied for each steering angle.

Meanwhile, in the above-described exemplary embodiment, in steps S210 and S220, it was described such that the inner rear disconnection device and inner rear attenuation device are controlled, but the control object in steps S210 and S220 may be not necessarily the disconnection device and attenuation device of the inner rear axle, and may also be a disconnection device and attenuation device of an inner front axle. That is, as long as it is a disconnection device and attenuation device of an inner axle, it is sufficient as a control object, and thus whether to target a disconnection device and attenuation device of a front axle or a disconnection device and attenuation device of a rear axle may be a simple choice. In the exemplary embodiment, in a case of front-wheel type four-wheel drive, the disconnection device and attenuation device of the inner rear axle are controlled, and in a case of rear-wheel type four-wheel drive, the disconnection device and attenuation device of the inner front axle are controlled.

In steps S210 and S220, in a case of controlling the disconnection device and attenuation device of the inner front axle, a value obtained by applying a weight to an average rotation speed of the rear wheels may be determined as a target rotation value, and then the attenuation device of the inner front axle may be controlled so that a rotation speed of an outer front wheel reaches the target rotation value. In addition, the disconnection device and attenuation device may not be configured on both the front axle (i.e., the FL axle and FR axle) and the rear axle (i.e., the RL axle and RR axle), but may also be configured only on the front axle or the rear axle. As such, even when the disconnection device and attenuation device are configured only on the front axle or rear axle, the above-described control for inhibiting a tight corner braking phenomenon may be performed.

According to the above description, during tight corner braking, power transmission to one inner wheel is blocked and the remaining wheels are rotated appropriately for their respective turning radii, so that the tight corner braking is resolved and power is transmitted to all the four wheels as soon as the turning drive is completed, whereby vehicle driving may be operated normally. In addition, even when a disconnection device and an attenuation device are configured only on the front axle or the rear axle, wheel slip may be inhibited from occurring as described above in a case where the slip occurs in a wheel connected to a corresponding axle. In addition, an axle to which a disconnection device and an attenuation device thereof are not applied may perform control by using existing braking force, and an axle to which a disconnection device and an attenuation device thereof are applied may perform wheel-slip control and torque vectoring control through the attenuation control.

Hereinafter, a disconnection/attenuation device is described. As shown in FIGS. 4 to 8, the disconnection/attenuation device includes a housing 1000, an input shaft 2000, an output shaft 3000, and a piston 4000. Such a disconnection/attenuation device is provided between a differential and a wheel, which construct a vehicle, so it is possible that received power transmitted from the differential may be transmitted to the wheel, or the power may not be transmitted to the wheel in spite of receiving the power transmitted from the differential. Furthermore, the disconnection/attenuation device may also control resistance applied to at least one end of the differential.

The housing 1000 is formed in a shape of an empty barrel, and provided with an entry part 1100 and an exit part 1200, which are formed to face each other. As an example, the housing 1000 having the shape of the lying cylindrical barrel may be formed with the entry part 1100 protruding toward the rear and the exit part 1200 protruding toward the front. Such a housing 1000 may be separately configured to include: a first housing 1000*a* in the shape of a barrel provided with an open rear side thereof and the exit part 1200 formed to face the front; and a second housing 1000*b* in the shape of a barrel provided with both an open front side thereof and the entry part 1100 formed to face the rear, so that the components provided therein may be assembled.

The input shaft 2000 refers to a driving shaft of the axle described above. The input shaft 2000 may be rotatably coupled to the entry part 1100 while passing through the entry part 1100 so that one end of the input shaft 2000 is provided in the housing 1000, and may be rotated by receiving power transmitted from the outside. For example, the other end of the input shaft 2000 may be connected to a differential and rotated by receiving power transmitted from the differential.

Figure 7:
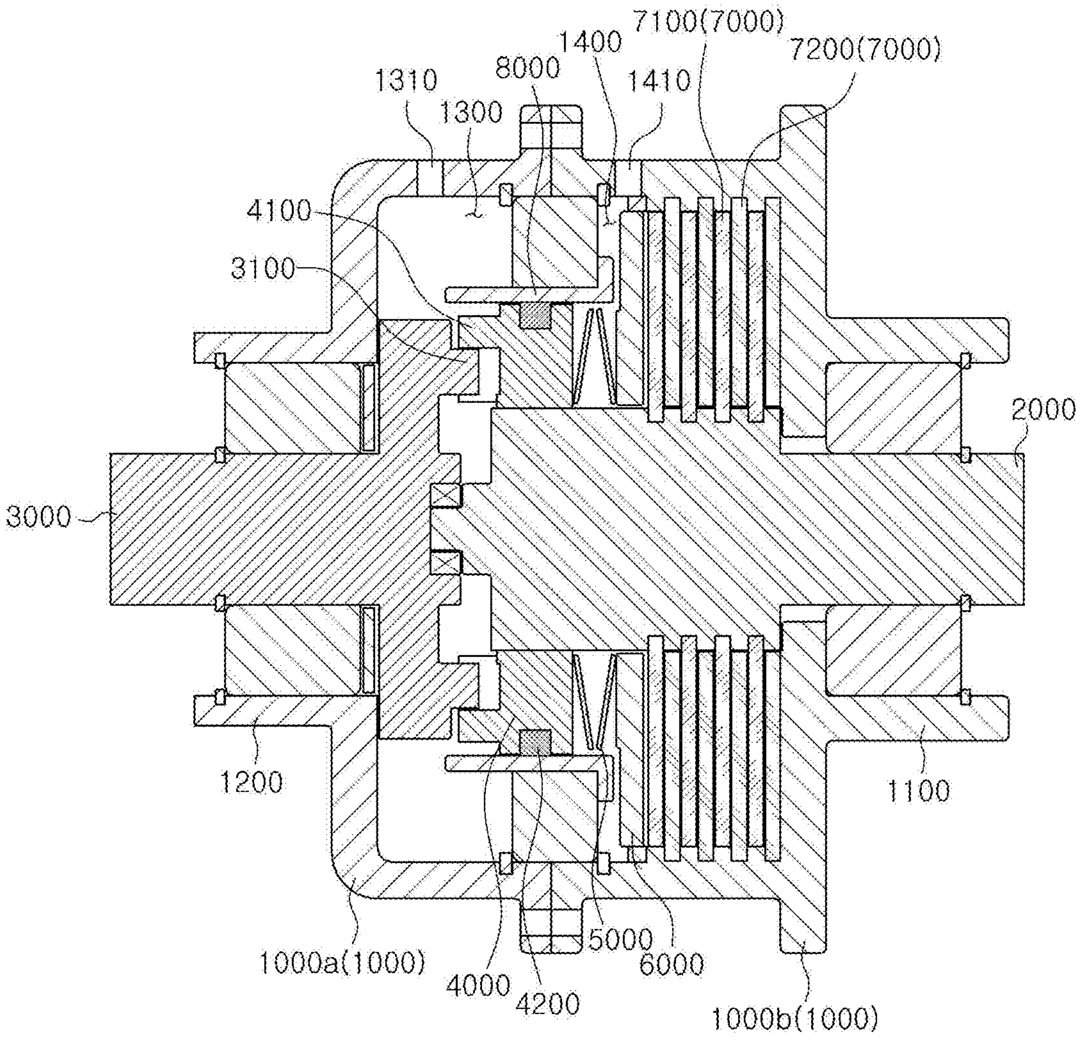
FIG. 7 is a cross-sectional view illustrating the disconnection/attenuation device according to the exemplary embodiment.
Figure 8:
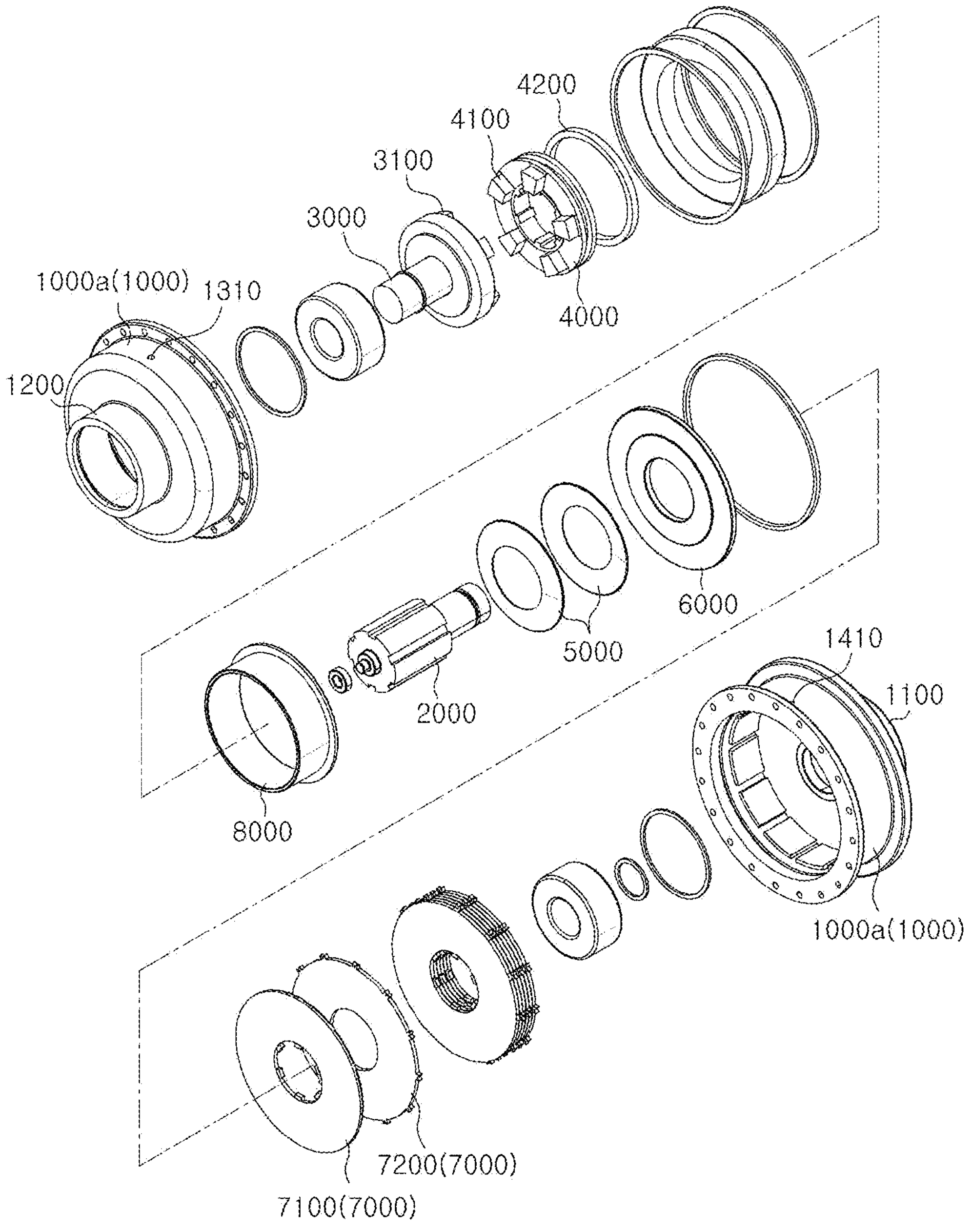
FIG. 8 is an exploded view illustrating the disconnection/attenuation device according to the exemplary embodiment.

The output shaft 3000 refers to a driven shaft of the axle described above. The output shaft 3000 may be rotatably coupled to the exit part 1200 while passing through the exit part 1200 so that one end of the output shaft 3000 is provided in the housing 1000, and the other end thereof may be connected to a wheel. One end of such an output shaft 3000 may receive power transmitted by engaging the piston 4000 configured to rotate integrally with the input shaft 2000. As an example, as shown in FIGS. 7 and 8, one end of the output shaft 3000 may be formed in a shape of a plate facing the piston 4000, and may have a plurality of first engaging protrusions 3100 formed to protrude radially facing the rear so as to engage the piston 4000. In addition, for stable rotation of the input shaft 2000 and output shaft 3000, the input shaft 2000 may be coupled to rotate independently through a bearing at a rotation center of one end of the output shaft 3000.

The piston 4000 may be formed in a ring shape and provided in the housing 1000 to surround one end of the input shaft 2000, and may be coupled to the input shaft 2000 to rotate integrally with the input shaft 2000. Such a piston 4000 may move in the front and rear directions along a longitudinal direction of one end of the input shaft 2000, and may move toward the front to engage one end of the output shaft 3000. As an example, a coupling groove is formed to be depressed radially along the longitudinal direction on an outer circumferential surface of one end of the input shaft 2000, and a coupling protrusion piece fitted into the coupling groove is formed to protrude radially on an inner circumferential surface of the piston 4000, so that the coupling protrusion piece moves along the coupling groove, whereby the piston 4000 may move in the front and rear directions of the input shaft 2000 and rotate integrally with the input shaft 2000.

In addition, as shown in FIGS. 7 and 8, the piston 4000 may have second engaging protrusions 4100 formed to protrude radially and disposed toward the front and between the plurality of first engaging protrusions 3100. That is, when the piston 4000 moves forward and the first engaging protrusions 3100 and the second engaging protrusions 4100 engage, power equivalent to the number of rotations of the input shaft 2000 is transmitted to the output shaft 3000, and when the piston 4000 moves backward and the engagement between the first engaging protrusions 3100 and second engaging protrusions 4100 is released, the power transmission to the output shaft 3000 is blocked, so that the output shaft 3000 does not rotate even when the input shaft 2000 is rotated.

As shown in FIGS. 7 and 8, the disconnection/attenuation device may further include a cylinder 8000 configured to provide a path for the piston 4000 to move in the front and rear directions within the housing 1000, and the cylinder 8000 may be provided in the housing 1000 so as to rotate together with the piston 4000. As an example, the cylinder 8000 may be rotatably provided inside a bearing fixed to an inner circumferential surface of the housing 1000, and the piston 4000 for moving in the front and rear directions may be provided inside the cylinder 8000. In this case, the piston 4000 is provided with a lip seal 4200 along a circumference thereof so as to enable the cylinder 8000 to rotate together with the piston 4000 by the lip seal 4200. In this way, as the piston 4000 and the cylinder 8000 rotate together, damage due to friction may be inhibited and durability may be improved.

In the exemplary embodiment, hydraulic pressure is used to ensure that the output shaft 3000 and the piston 4000 are engaged or the engagement between the output shaft 3000 and the piston 4000 is released. To this end, as shown in FIG. 7, the housing 1000 may include a first control space 1300 formed on a front side relative to the piston 4000, and it is preferable that the first control space 1300 is spatially separated from a rear side of the piston 4000 through other components including the piston 4000. In addition, the housing 1000 may be provided with a first control hole 1310 formed to pass therethrough to allow the first control space 1300 to communicate with the outside, and hydraulic oil may flow in and out through the first control hole 1310.

Figure 9:
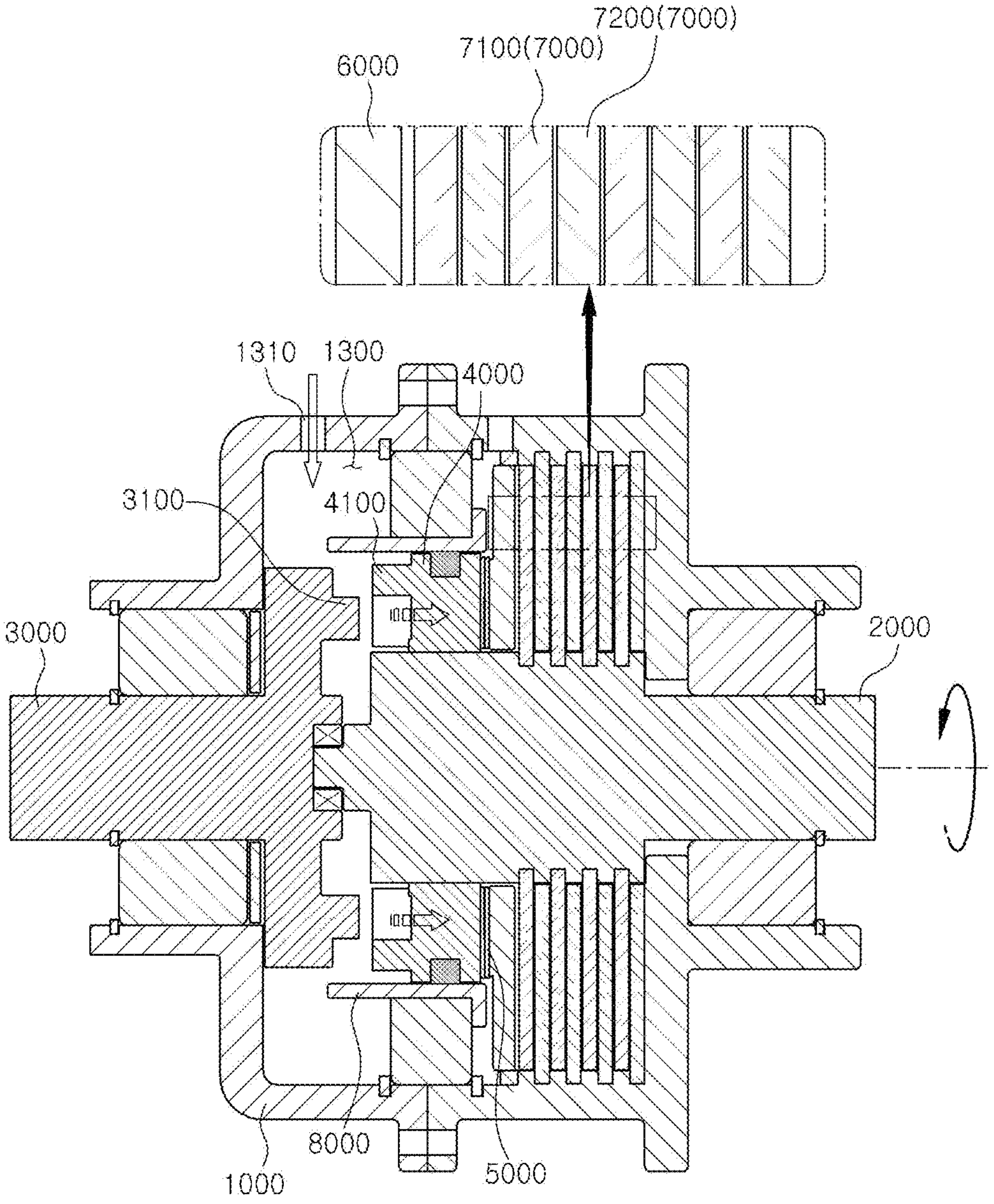
FIG. 9 is an exemplary view illustrating an operation when 1-1 hydraulic oil flows into the disconnection/attenuation device according to the exemplary embodiment.

As an example, when hydraulic oil having a 1-1 set pressure flows into the first control space 1300 through the first control hole 1310 in a state of the piston 4000 moving forward to engage the output shaft 3000, as shown in FIG. 9, the piston 4000 is moved backward and disengaged from the output shaft 3000, and accordingly, power transmission between the input shaft 2000 and the output shaft 3000 is blocked. In contrast, when the hydraulic oil having the 1-1 set pressure introduced through the first control hole 1310 is discharged to the outside in a state of the piston 4000 moving backward and being disengaged from the output shaft 3000, the piston 4000 is moved forward and engaged with the output shaft 3000, and accordingly, power transmission between the input shaft 2000 and the output shaft 3000 is enabled.

As another example, hydraulic oil having a 1-2 set pressure higher than the 1-1 set pressure may flow in and out through the first control hole 1310, and in this case, the disconnection/attenuation device may further include a deceleration module provided between the input shaft 2000 and the housing 1000 on a rear side relative to the piston 4000. The deceleration module is operated when the hydraulic oil having the 1-2 set pressure flows into the first control space 1300, and may reduce the rotation of the input shaft 2000 in a state where power transmission between the input shaft 2000 and the output shaft 3000 is blocked. For example, as shown in FIGS. 7 and 8, such a deceleration module may include an elastic member 5000, a pressure plate 6000, and a multi-plate clutch 7000.

Figure 10:
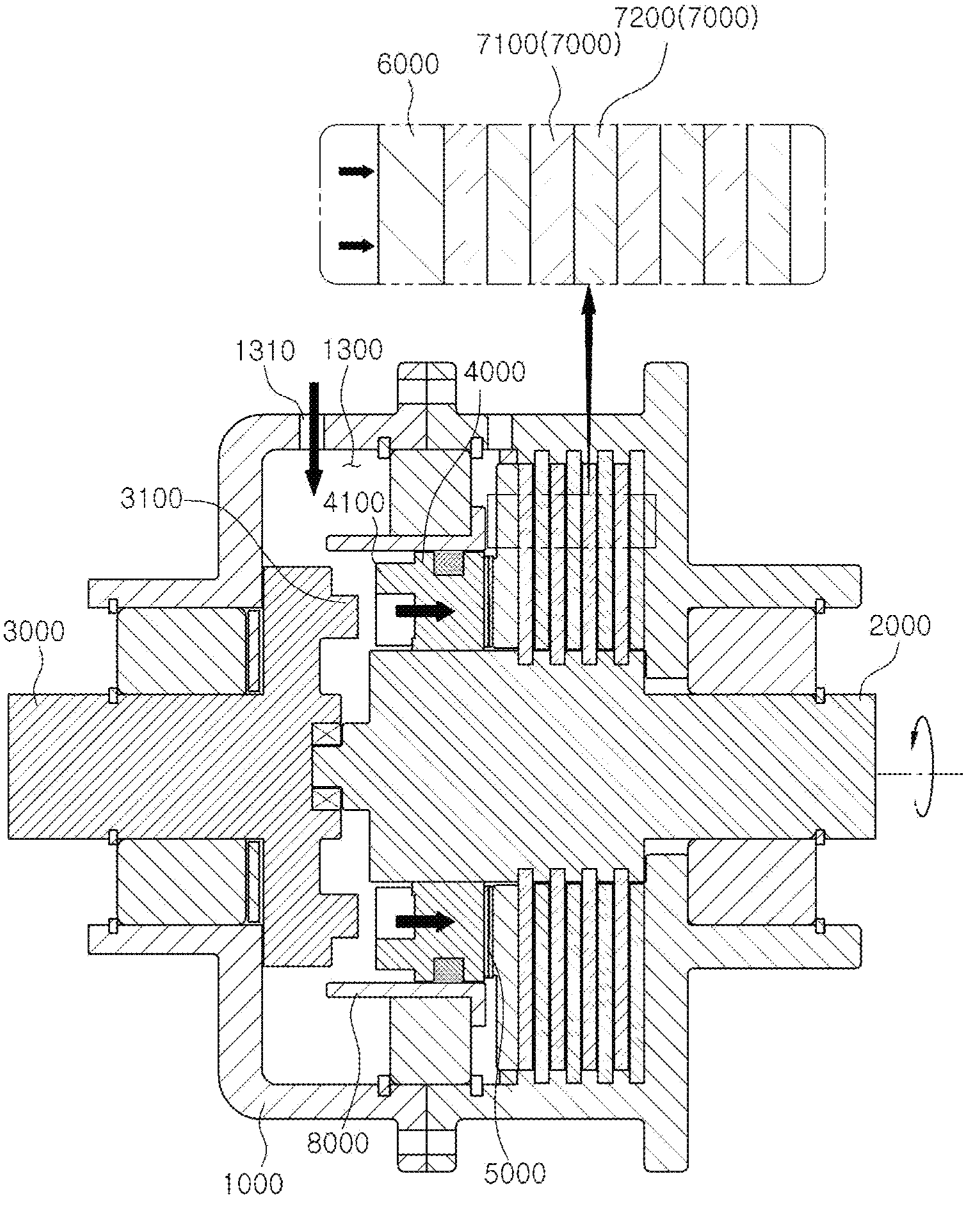
FIG. 10 is an exemplary view illustrating an operation when 1-2 hydraulic oil flows into the disconnection/attenuation device according to the exemplary embodiment.
Figure 11:
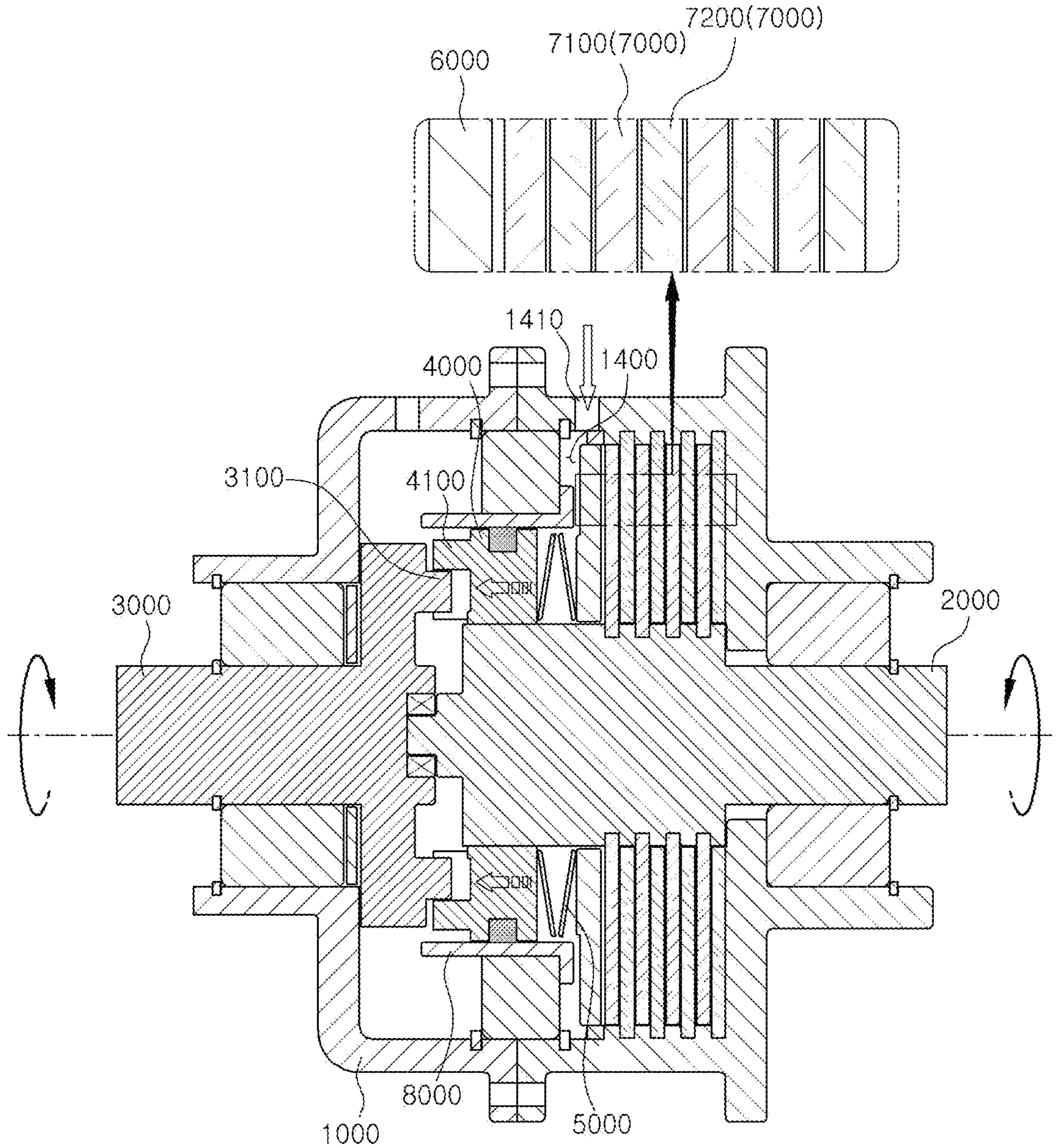
FIG. 11 is an exemplary view illustrating an operation when 2-1 hydraulic oil flows into the disconnection/attenuation device according to the exemplary embodiment.
Figure 12:
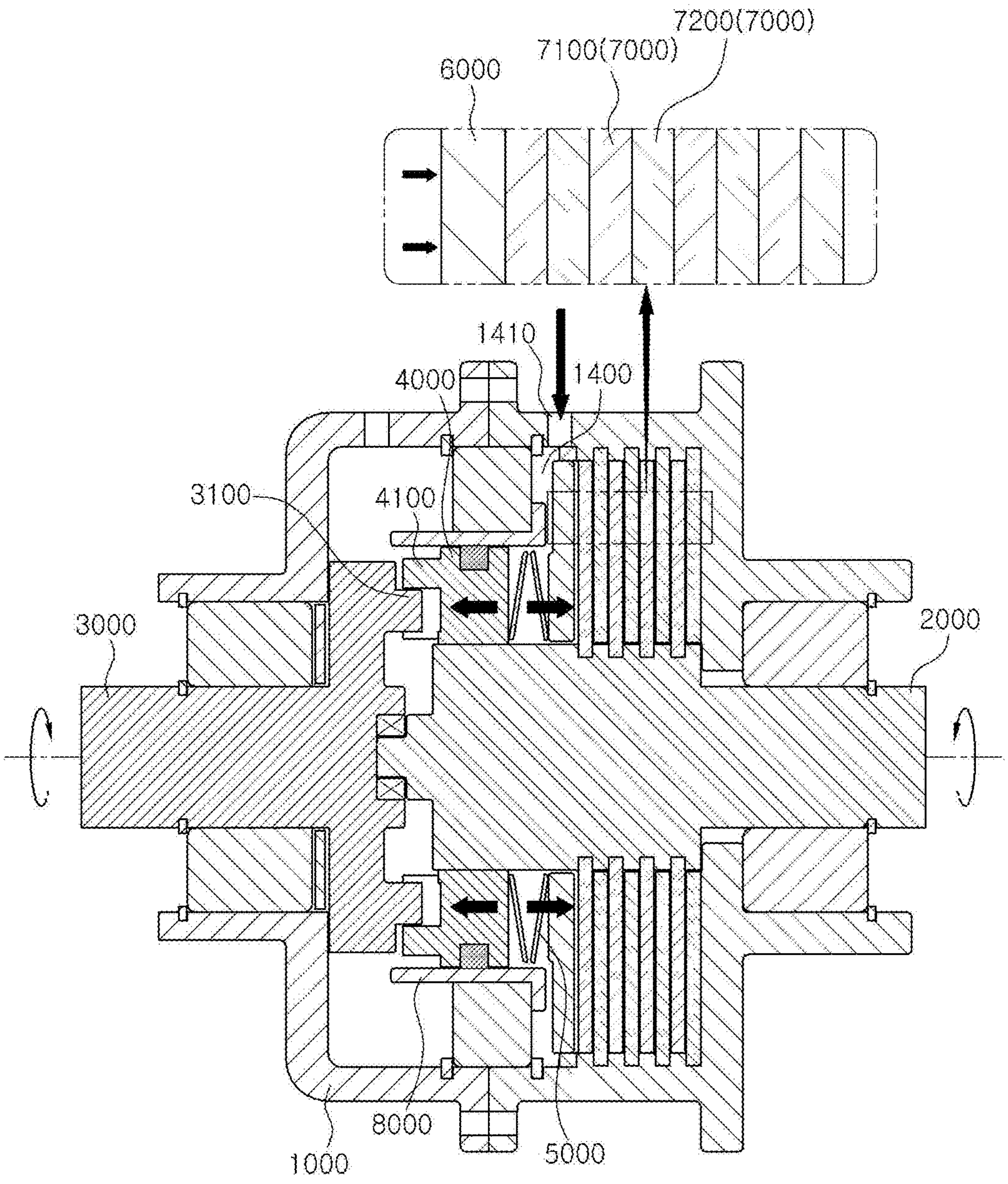
FIG. 12 is an exemplary view illustrating an operation when 2-2 hydraulic oil flows into the disconnection/attenuation device according to the exemplary embodiment.

The elastic member 5000 may be disposed at a position adjacent to the rear of the piston 4000 while surrounding the input shaft 2000, and may be provided inside the cylinder 8000. The elastic member 5000 serves to elastically support force applied in the front and rear directions between the piston 4000 and the pressure plate 6000. As an example, when the hydraulic oil having the 1-1 set pressure flows into the first control space 1300, the elastic member 5000 may elastically support the pressure plate 6000 so as not to be pushed backward in a state of the piston 4000 moved backward and disengaged from the output shaft 3000. In contrast, as shown in FIG. 10, when the hydraulic oil having the 1-2 set pressure higher than the 1-1 set pressure and greater than the elastic force of the elastic member 5000 flows into the first control space 1300, the elastic member 5000 pushes the pressure plate 6000 backward.

For example, as shown in FIGS. 7 and 8, as the elastic member 5000, a plurality of disk springs may be symmetrically disposed back and forth. Specifically, two disk springs may be disposed so that outer ends thereof are adjacent to each other and inner ends thereof are spaced apart from each other.

The pressure plate 6000 is formed in a shape of a disk having a through hole formed in the center thereof, and may be disposed at a position adjacent to the rear of the elastic member 5000 while surrounding the input shaft 2000. Such a pressure plate 6000 may not only serve to cause the elastic member 5000 provided between itself and the piston 4000 to apply the elastic force thereof within a predetermined range, but also serve to reduce the rotation speed of the input shaft 2000 by causing friction to be generated with the multi-plate clutch 7000 while eliminating air gaps in the multi-plate clutch 7000 when pushback to the rear occurs. Accordingly, as shown in FIG. 9, when the hydraulic oil having the 1-1 set pressure flows into the first control space 1300, the pressure plate 6000 supports the elastic member 5000 in a state of being somewhat spaced apart from the multi-plate clutch 7000, and as shown in FIG. 10, when the hydraulic oil having the 1-2 set pressure flows into the first control space 1300, the pressure plate 6000 moves to come into contact with the multi-plate clutch 7000.

The multi-plate clutch 7000 is formed in a shape of disks having a through hole formed in the center thereof, and may be disposed at a position adjacent to the rear of the pressure plate 6000 while surrounding the input shaft 2000, and may include drive disks 7100 and driven disks 7200. As shown in FIGS. 7 and 8, the drive disk 7100 may have gear teeth machined at regular intervals on an inner circumference thereof and coupled to the input shaft 2000, so as to rotate integrally with the input shaft 2000, and the driven disk 7200 may have gear teeth machined at regular intervals on an outer circumference thereof and fixed to the housing 1000. In the multi-disk clutch 7000, multiple pairs of the above-described drive disks 7100 and driven disks 7200 are repeatedly installed in the front and rear directions and installed to be somewhat spaced apart from each other to generate the air gaps. Accordingly, when the pressure plate 6000 is pushed backward, not only friction is generated between the pressure plate 6000 and the multi-plate clutch 7000, but also friction is generated between the drive disks 7100 rotating integrally with the input shaft 2000 and the driven disks 7200 fixed to the housing 1000, whereby the rotation of the input shaft 2000 is reduced.

That is, as shown in FIG. 10, when the hydraulic oil having the 1-2 set pressure flows into the first control space 1300, the elastic member 5000 presses the pressure plate 6000 and multi-plate clutch 7000 as the piston 4000 moves backward, whereby the rotation of the input shaft 2000 is reduced due to the friction between the pressure plate 6000 and the multi-plate clutch 7000 and the friction of the multi-plate clutch 7000 itself.

Meanwhile, as shown in FIG. 7, the housing 1000 may include a second control space 1400 formed between the piston 4000 and the pressure plate 6000 and provided with an elastic member 5000, and it is preferable that the second control space 1400 is spatially separated from the first control space 1300. In addition, the housing 1000 may be provided with a first control hole 1310 formed to pass therethrough to allow the second control space 1400 to communicate with the outside, and hydraulic oil may flow in and out through the second control hole 1410.

As an example, as shown in FIG. 8, when hydraulic oil having a 2-1 set pressure flows into the second control space 1400 through the second control hole 1410 in a state where engagement between the piston 4000 and the output shaft 3000 is released, the piston 4000 is moved forward to engage the output shaft 3000, and accordingly, power transmission between the input shaft 2000 and the output shaft 3000 is enabled. Typically, the piston 4000 maintains a state of engagement with the output shaft 3000 by the elastic force of the elastic member 5000, so the control through the hydraulic oil having the 2-1 set pressure is useful when the piston 4000 which has moved backward by the hydraulic oil having the 1-1 set pressure is to move forward more quickly, whereby the power that is blocked between the input shaft 2000 and the output shaft 3000 may be transmitted quickly.

As another example, hydraulic oil having a 2-2 set pressure higher than the 2-1 set pressure may flow in and out through the second control hole 1410, and as shown in FIG. 9, when the hydraulic oil having the 2-2 set pressure flows into the second control space 1400, the pressure plate 6000 presses the multi-plate clutch 7000, whereby the rotation of the input shaft 2000 may be reduced. That is, in a state where the output shaft 3000 and the piston 4000 are engaged with each other and power transmission is enabled, the rotation speed of the input shaft 2000 and the output shaft 3000 may be reduced through the inflow of the hydraulic fluid having the 2-2 set pressure.

So far, the present disclosure is described in detail while focusing on the preferred exemplary embodiments. Those skilled in the art to which the present disclosure belongs will appreciate that modified forms may be implemented to the extent that the present disclosure does not deviate from the essential characteristics of the present disclosure. Therefore, the disclosed exemplary embodiments should be considered from a descriptive perspective rather than a restrictive perspective. The scope of the present disclosure is indicated in the claims rather than the above description, and all differences within the scope equivalent to the claims should be construed as being included in the present disclosure.

The invention claimed is:

1. A driving stabilization system for a four-wheel drive vehicle, the system comprising:
   - a plurality of axles each axle comprising a driving shaft connected to a front differential or a rear differential of the four-wheel drive vehicle and a driven shaft connected to the driving shaft and configured to transmit power of the driving shaft to a wheel;
   - a plurality of disconnection devices, each disconnection device being provided for a corresponding axle among the plurality of axles and configured to disconnect a connection between the driving shaft and the driven shaft of the corresponding axle;
   - a plurality of attenuation devices, each attenuation device being provided for a corresponding axle among the plurality of axles and configured to attenuate a driving force of the driving shaft of the corresponding axle; and
   - a control unit configured to stabilize vehicle driving by controlling at least one of the plurality of disconnection devices and at least one of the plurality of attenuation devices in a case where vehicle driving stabilization is required, wherein, for each axle among the plurality of axles, the disconnection device and the attenuation device provided for the axle are integrally formed.

2. The system of claim 1, wherein, in a case where wheel slip requiring the vehicle driving stabilization occurs, the control unit controls the disconnection device provided for an axle, among the plurality of axles, on a slip wheel side to disconnect the connection between the driving shaft and the driven shaft of the axle on the slip wheel side, and controls the attenuation device provided for the axle on the slip wheel side to attenuate the driving force of the driving shaft of the axle on the slip wheel side, so as to cause the power to be transmitted through the corresponding axle to an opposite wheel connected to a same differential as that of a slip wheel.

3. The system of claim 1, wherein, in a case where a tight corner braking phenomenon requiring the vehicle driving stabilization is detected while the vehicle is turning, the control unit controls the disconnection device provided for an axle, among the plurality of axles, on a side of any one inner wheel among inner wheels in a turning direction to disconnect the connection between the driving shaft and the driven shaft of the axle on the inner wheel side, and controls the attenuation device provided for the axle on the inner wheel side to attenuate the driving force of the driving shaft of the axle on the inner wheel side, so as to transmit the power to an outer wheel through the corresponding axle.

4. The system of claim 3, wherein the plurality of axles comprises only a left axle and a right axle that are connected to a same differential either the front differential or the rear differential.

5. The system of claim 3, wherein, when a steering wheel is restored to a center range after control for inhibiting the tight corner braking phenomenon is performed, the control unit controls the disconnection device on the inner wheel side to reconnect the driving shaft and the driven shaft.

6. The system of claim 5, wherein, in a case where a rotation speed of the inner wheel and a rotation speed of the driving shaft on the inner wheel side are out of a predetermined error range, the control unit performs at least one among braking control and attenuation control to cause those rotation speeds to be within the error range before reconnecting the driving shaft and the driven shaft.

7. A driving stabilization system for a four-wheel drive vehicle, the system comprising:

a plurality of axles each axle comprising a driving shaft connected to a front differential or a rear differential of the four-wheel drive vehicle and a driven shaft connected to the driving shaft and configured to transmit power of the driving shaft to a wheel;

a plurality of disconnection devices, each disconnection device being provided for a corresponding axle among the plurality of axles and configured to disconnect a connection between the driving shaft and the driven shaft of the corresponding axle;

a plurality of attenuation devices, each attenuation device being provided for a corresponding axle among the plurality of axles and configured to attenuate a driving force of the driving shaft of the corresponding axle; and a control unit configured to stabilize vehicle driving by controlling at least one of the plurality of disconnection devices and at least one of the plurality of attenuation devices in a case where vehicle driving stabilization is required, wherein, in a case where wheel slip requiring the vehicle driving stabilization occurs, the control unit controls the disconnection device provided for an axle, among the plurality of axles, on a slip wheel side to disconnect the connection between the driving shaft and the driven shaft of the axle on the slip wheel side, and controls the attenuation device provided for the axle on the slip wheel side to attenuate the driving force of the driving shaft of the axle on the slip wheel side, so as to cause the power to be transmitted through the corresponding axle to an opposite wheel connected to a same differential as that of a slip wheel, wherein the control unit controls the attenuation device on the slip wheel side so that a rotation speed of the opposite wheel becomes the same as a rotation speed of a target wheel.

8. The system of claim 7, wherein the control unit determines that the vehicle driving is stabilized so as to reconnect the driving shaft and the driven shaft through control of the disconnection device on the slip wheel side when the rotation speed of the opposite wheel becomes the same as the rotation speed of the target wheel.

9. The system of claim 8, wherein, in a case where a rotation speed of the slip wheel and a rotation speed of the driving shaft on the slip wheel side are out of a predetermined error range, the control unit performs at least one among braking control and attenuation control so as to cause those rotation speeds to be within the error range before reconnecting the driving shaft and the driven shaft.

10. A driving stabilization method for a four-wheel drive vehicle, the method comprising:

determining whether driving stabilization of the four-wheel drive vehicle is required or not;

controlling disconnection of a connection between a driving shaft and driven shaft of any one axle among a plurality of axles each axle comprising both of the driving shaft connected to a front differential or rear differential and the driven shaft connected to the driving shaft and configured to transmit power of the driving shaft to a wheel to result in a connection-blocked driving shaft when the driving stabilization of the four-wheel drive vehicle is required, wherein the controlling of the disconnection disconnects the connection between the driving shaft and the driven shaft on a slip wheel side when wheel slip requiring the vehicle driving stabilization occurs;

controlling attenuation of a driving force of the connection-blocked driving shaft, wherein the controlling of the attenuation attenuates the driving force of the connection-blocked driving shaft, so as to transmit the power through the corresponding axle to an opposite wheel connected to a same differential as that of a slip wheel; and determining that vehicle driving is stabilized so as to reconnect the driving shaft and driven shaft on the slip wheel side when a rotation speed of the opposite wheel becomes the same as a rotation speed of a target wheel, and, in a case where a rotation speed of the slip wheel and a rotation speed of the driving shaft on the slip wheel side are out of a predetermined error range, performing at least one among braking control and attenuation control to cause those rotation speeds to be within the predetermined error range before reconnecting the driving shaft and the driven shaft.

11. A driving stabilization method for a four-wheel drive vehicle, the method comprising:

determining whether driving stabilization of the four-wheel drive vehicle is required or not;

controlling disconnection of a connection between a driving shaft and driven shaft of any one axle among a plurality of axles each axle comprising both of the driving shaft connected to a front differential or rear differential and the driven shaft connected to the driving shaft and configured to transmit power of the driving shaft to a wheel to result in a connection-blocked driving shaft when the driving stabilization of the four-wheel drive vehicle is required; and controlling attenuation of a driving force of the connection-blocked driving shaft, wherein the controlling of the disconnection disconnects the connection between the driving shaft and the driven shaft on any one of inner wheels in a turning direction when a tight corner braking phenomenon requiring the vehicle driving stabilization is detected while the vehicle is turning, and the controlling of the attenuation inhibits the tight corner braking phenomenon by attenuating the driving force of the connection-blocked driving shaft to transmit the power through the corresponding axle to an outer wheel.

12. The method of claim 11, wherein the controlling of the attenuation controls to attenuate the driving force of the connection-blocked driving shaft so that the outer wheel turns appropriately for a rotation radius of the outer wheel.

13. The method of claim 11, further comprising:

reconnecting the driving shaft and driven shaft on an inner wheel side when a steering wheel is restored to a center range after the controlling of the attenuation.

* * * * *